United States Patent
Bristol et al.

(10) Patent No.: US 8,414,015 B2
(45) Date of Patent: Apr. 9, 2013

(54) VEHICLE AIRBAG SUPPORT STRUCTURE

(75) Inventors: Michael Bristol, Algonac, MI (US); Chad Kwolek, Hartland, MI (US)

(73) Assignee: Nissan North America, Inc., Franklin, TN (US)

( * ) Notice: Subject to any disclaimer, the term of this patent is extended or adjusted under 35 U.S.C. 154(b) by 177 days.

(21) Appl. No.: 13/012,498

(22) Filed: Jan. 24, 2011

(65) Prior Publication Data

US 2012/0187665 A1 Jul. 26, 2012

(51) Int. Cl.
*B60R 21/205* (2006.01)
*B60R 21/045* (2006.01)

(52) U.S. Cl. ............ 280/728.2; 280/732; 280/752; 296/187.05; 296/193.02

(58) Field of Classification Search ......... 280/728.2, 280/732, 752; 296/187.05, 192, 193.02, 296/72
See application file for complete search history.

(56) References Cited

U.S. PATENT DOCUMENTS

| | | | |
|---|---|---|---|
| 5,037,130 A | 8/1991 | Okuyama | |
| 5,092,627 A | 3/1992 | Igawa | |
| 5,096,223 A | 3/1992 | Tekelly et al. | |
| 5,403,033 A * | 4/1995 | Koma | 280/728.2 |
| 5,518,270 A * | 5/1996 | Hanada et al. | 280/751 |
| 5,533,747 A | 7/1996 | Rose | |
| 5,700,028 A | 12/1997 | Logan et al. | |
| 5,700,029 A | 12/1997 | Enders | |
| 5,709,403 A * | 1/1998 | Taguchi et al. | 280/735 |
| 6,126,192 A * | 10/2000 | Enders | 280/728.2 |
| 6,145,880 A * | 11/2000 | White et al. | 280/752 |
| 6,173,988 B1 | 1/2001 | Igawa | |
| 6,176,511 B1 | 1/2001 | Adkisson et al. | |
| 6,286,858 B1 | 9/2001 | Shepherd et al. | |
| 6,296,277 B1 | 10/2001 | Bittinger et al. | |
| 6,312,008 B1 | 11/2001 | Neag | |
| 6,536,802 B1 * | 3/2003 | Sutherland et al. | 280/752 |
| 6,951,348 B2 * | 10/2005 | Enders | 280/728.2 |
| 6,983,954 B2 * | 1/2006 | Sakaguchi | 280/728.2 |
| 7,175,195 B2 * | 2/2007 | Morita | 280/730.1 |
| 7,290,788 B2 | 11/2007 | Tomford et al. | |

(Continued)

FOREIGN PATENT DOCUMENTS

| | | |
|---|---|---|
| JP | 05-286400 A | 11/1993 |
| JP | 2005-035541 A | 2/2005 |
| JP | 2008-110737 A | 5/2008 |
| WO | WO-03/051682 A1 | 6/2003 |

*Primary Examiner* — Paul N Dickson
*Assistant Examiner* — Laura Freedman
(74) *Attorney, Agent, or Firm* — Global IP Counselors, LLP

(57) ABSTRACT

A vehicle airbag support structure comprises a base member, a first support leg and a mounting arrangement. The base member defines an inflator aperture for receiving a portion of a vehicle airbag module supported on a top surface of the base member. The first support leg includes first and second ends with first and second segments disposed between the first and second ends. The first end is attached to a peripheral portion of the base member with the first and second segments disposed on a bottom side of the base member that faces in an opposite direction from the top surface. The first and second segments extend perpendicularly and non-orthogonally, respectively, with respect to the base member. The mounting arrangement is attached to the second end and defines a fastening aperture with a center fastener axis arranged in a direction parallel to a plane including the top surface.

20 Claims, 16 Drawing Sheets

U.S. PATENT DOCUMENTS

| | | |
|---|---|---|
| 7,350,805 B2 | 4/2008 | Kumagai |
| 7,393,004 B2 * | 7/2008 | Ono et al. ............... 280/728.2 |
| 7,448,642 B2 * | 11/2008 | Boggess et al. ........... 280/728.2 |
| 7,712,777 B2 | 5/2010 | Breed |
| 7,938,444 B2 | 5/2011 | Williams et al. |
| 8,146,942 B2 * | 4/2012 | Bruning et al. ........... 280/728.2 |

* cited by examiner

VEHICLE AIRBAG SUPPORT STRUCTURE

BACKGROUND OF THE INVENTION

1. Field of the Invention

The present invention relates to a vehicle airbag support structure. More specifically, the present invention relates to a vehicle airbag support structure that is configured to absorb resistive forces applied by obstacles in a passenger compartment during airbag deployment.

2. Background Information

Various portions of vehicles are continuously being redesigned and modified to increase performance, reduce cost or weight, and/or comply with regulatory standards. For example, airbags are typically installed to protect passengers in the event of an impact event. Airbags are operably connected to an airbag deployment system which typically includes a triggering device. The triggering device detects rapid changes in acceleration due to an impact event. Upon the detection of an impact event above a prescribed threshold, the triggering device sends a signal to the airbag deployment system instructing the system to deploy the airbag(s) in a vehicle.

SUMMARY

In view of the state of the known technology, one aspect of the present invention is directed to a vehicle airbag support structure comprising a base member, a first support leg and a mounting member. The base member defines an inflator aperture for receiving at least a portion of a vehicle airbag module such that the vehicle airbag module is supported on a top surface of the base member. The first support leg includes a first end and a second end with a first segment and a second segment disposed between the first and second ends. The first end is attached to a peripheral portion of the base member with the first and second segments being disposed on a bottom side of the base member that faces in an opposite direction from the top surface of the base member. The first segment extends perpendicularly with respect to the base member, and the second segment extends non-orthogonally with respect to the base member. The mounting arrangement is attached to the second end of the first support leg, and the mounting arrangement defines a fastening aperture with a center fastener axis arranged in a direction that is parallel to a plane including the top surface of the base member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
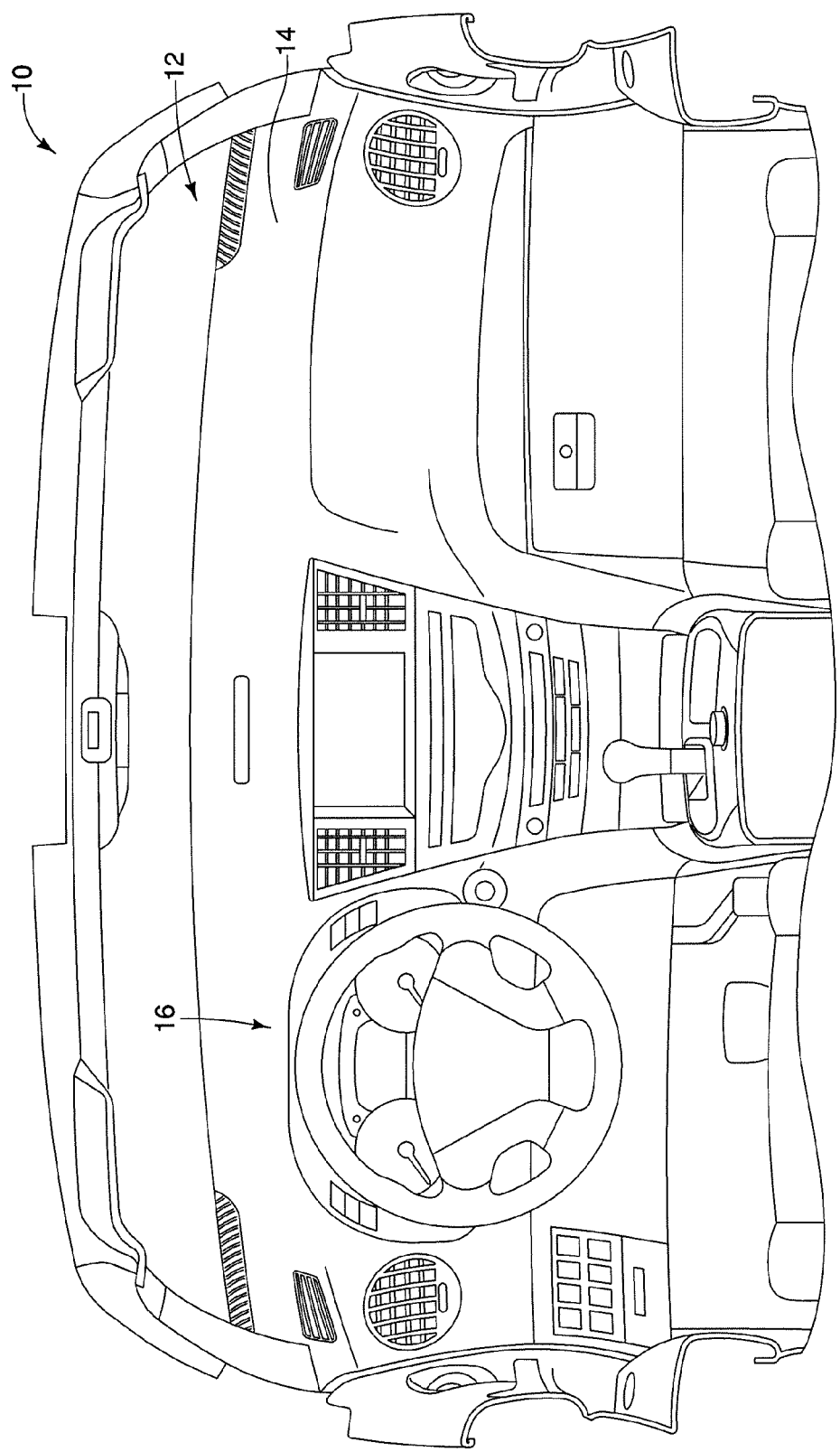
FIG. 1 is a perspective view of a vehicle passenger compartment.
Figure 2:
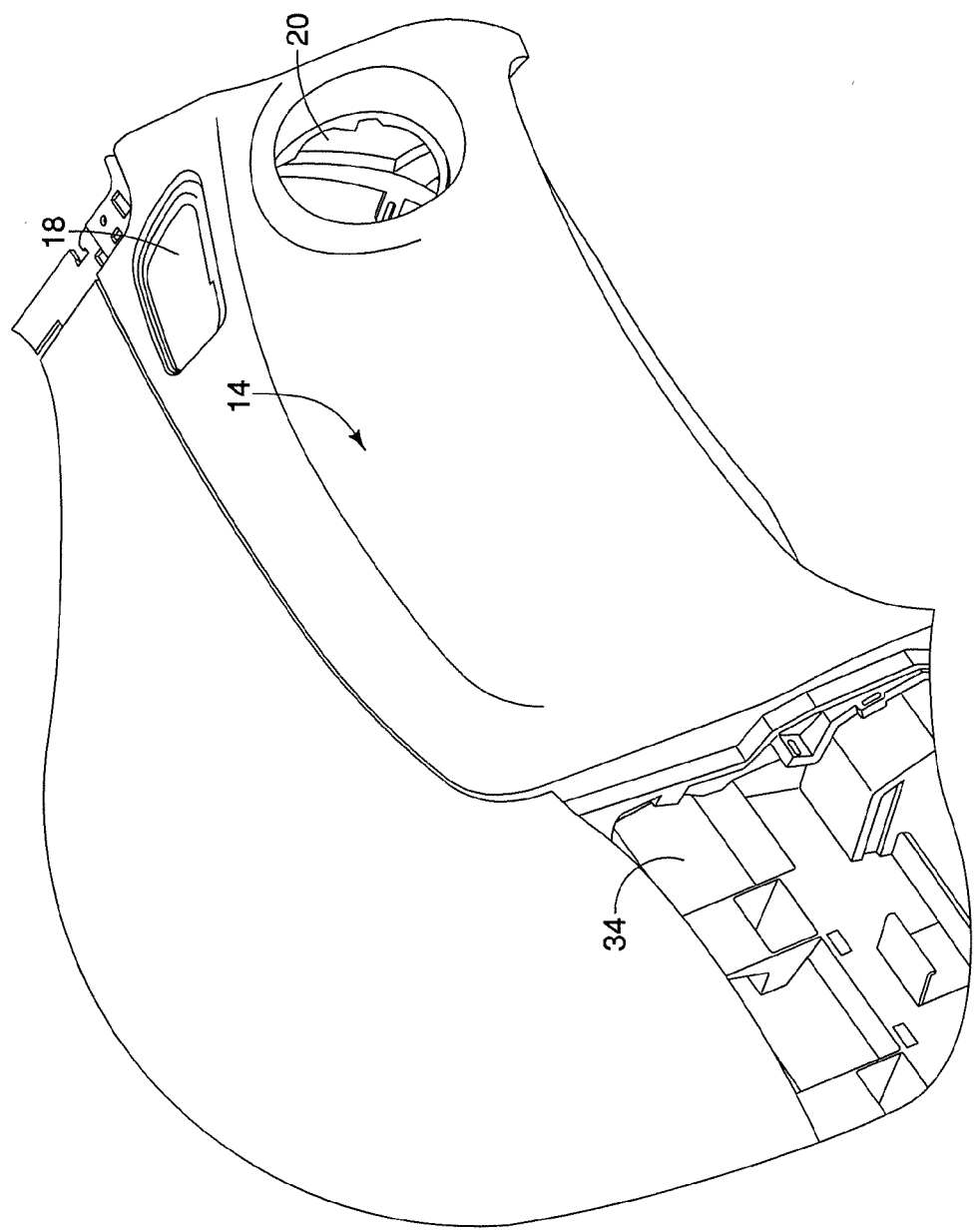
FIG. 2 is a detailed perspective view of a portion of a vehicle dashboard.
Figure 3:
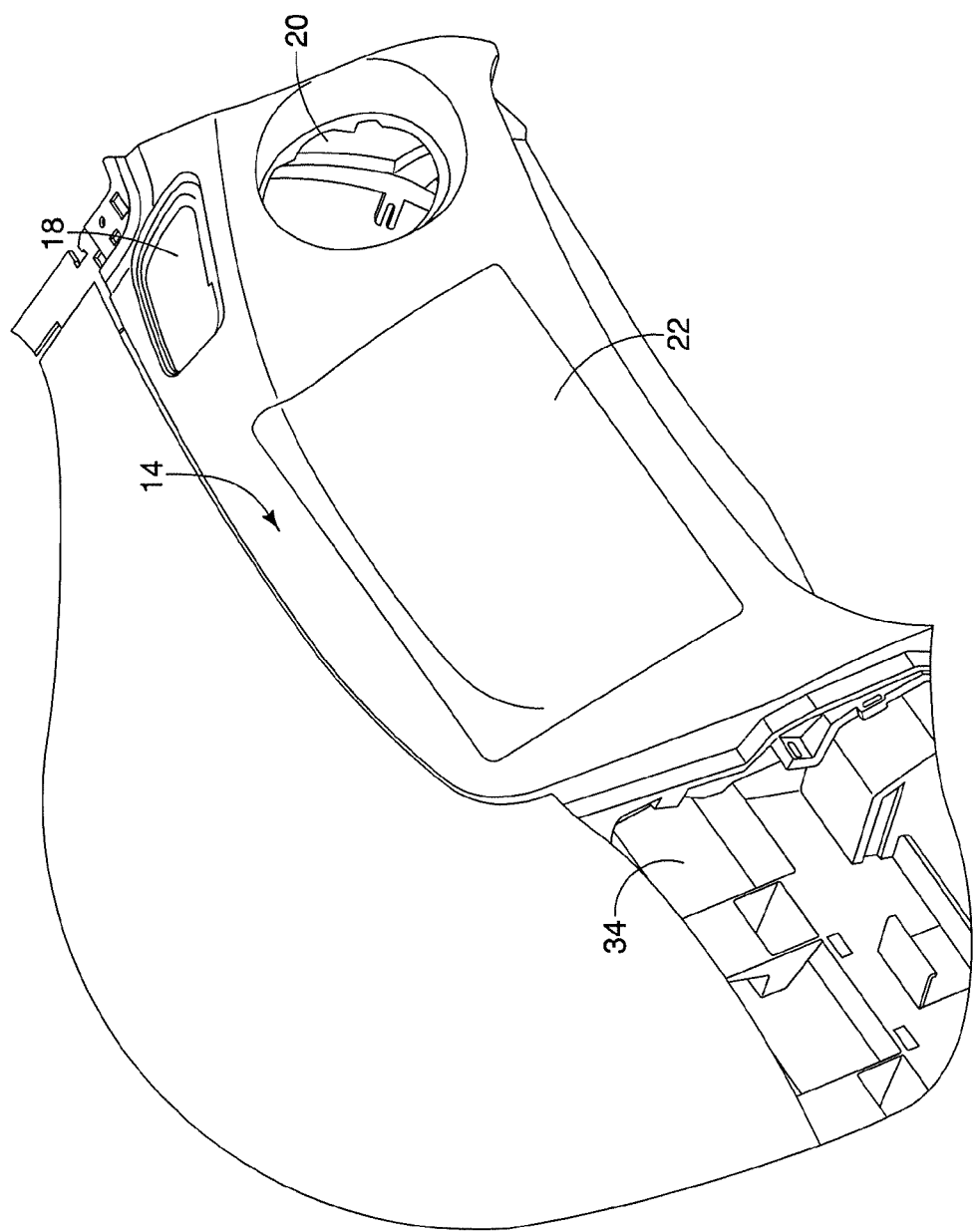
FIG. 3 is a detailed perspective view of the portion of the vehicle dashboard showing an airbag cover panel.
Figure 4:
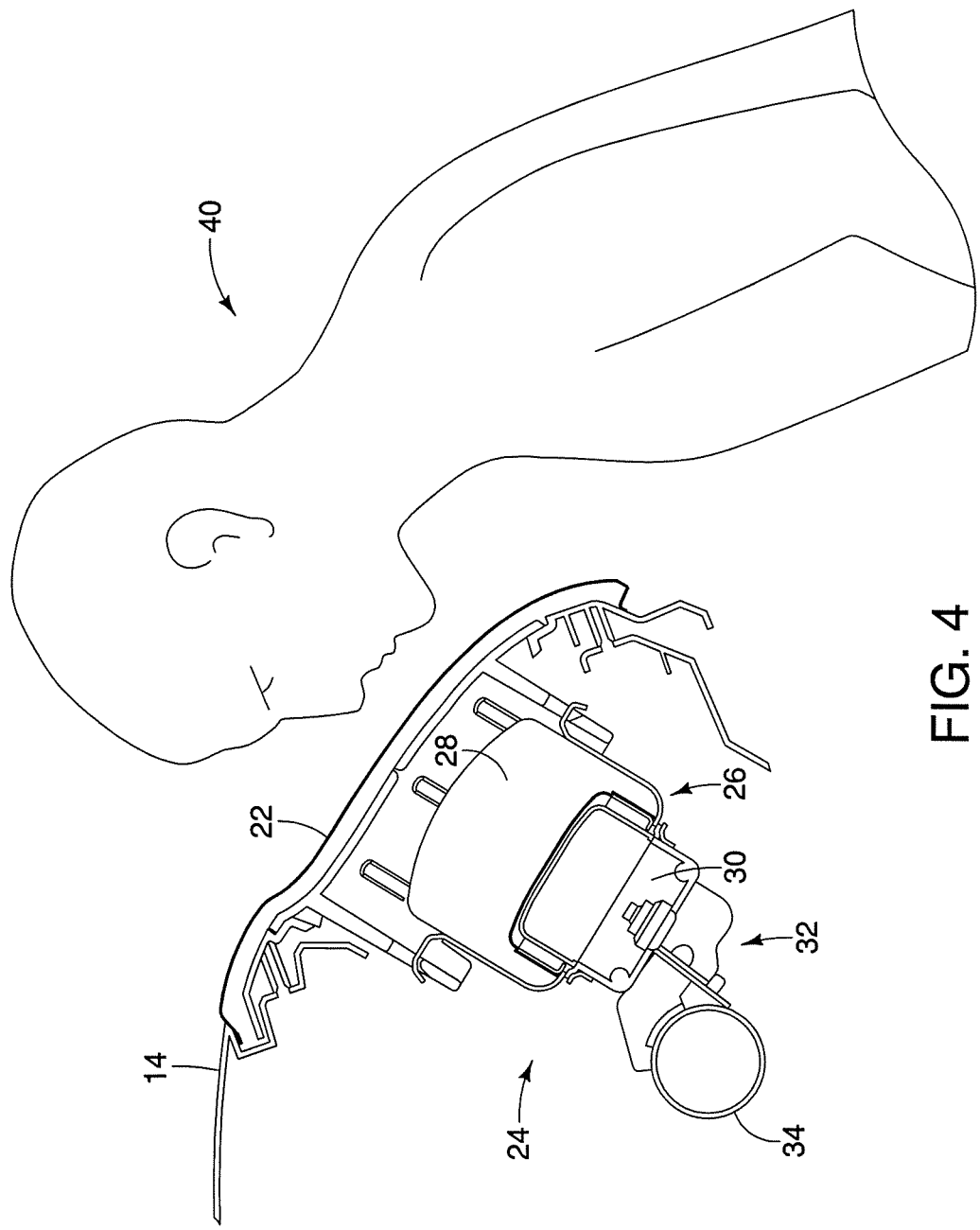
FIG. 4 is a cross-sectional view of the vehicle dashboard and airbag assembly showing an undeployed airbag.

Referring initially to FIGS. 1-3, a vehicle 10 has a passenger compartment 12 and a dashboard 14 generally at the front of the passenger compartment 12. The dashboard 14 typically includes an instrument panel 16, and a plurality of grill openings 18 and 20 which can accommodate vent outlets, speakers and so on. As shown in FIG. 3, an airbag cover panel 22 can be located in the dashboard 14 to allow for airbag deployment. It should be noted that FIG. 3 illustrates the dashboard 14 with an outer skin material removed in order to highlight the presence of the airbag cover panel 22. However, those skilled in the art will appreciate that the dashboard 14 can maintain an overall appearance as shown in FIG. 2 in order to conceal the presence of the airbag cover panel 22 for aesthetic purposes.

As shown in more detail in FIGS. 4-14, a vehicle airbag assembly 24 is disposed behind the airbag cover panel 22. In this example, the vehicle airbag assembly 24 includes a vehicle airbag module 26 that houses an airbag 28 and an airbag inflator 30. A vehicle airbag support structure 32 secures the vehicle airbag module 26 to a structural support member 34, such as a cross-car beam, that is secured to the vehicle 10 by welds, bolts or other suitable securing members. The structural support member 34 can be situated adjacent to or behind the instrument panel 16 as shown in the figures. However, a vehicle airbag assembly 24 according to the present invention can be located in various other locations within a particular vehicle. Also, additional mounting members 36 and 38 can extend from the vehicle airbag module 26 and be attached to, for example, portions of the dashboard 14 by screws, rivets, bolts or any other suitable type of fastener.

Figure 5:
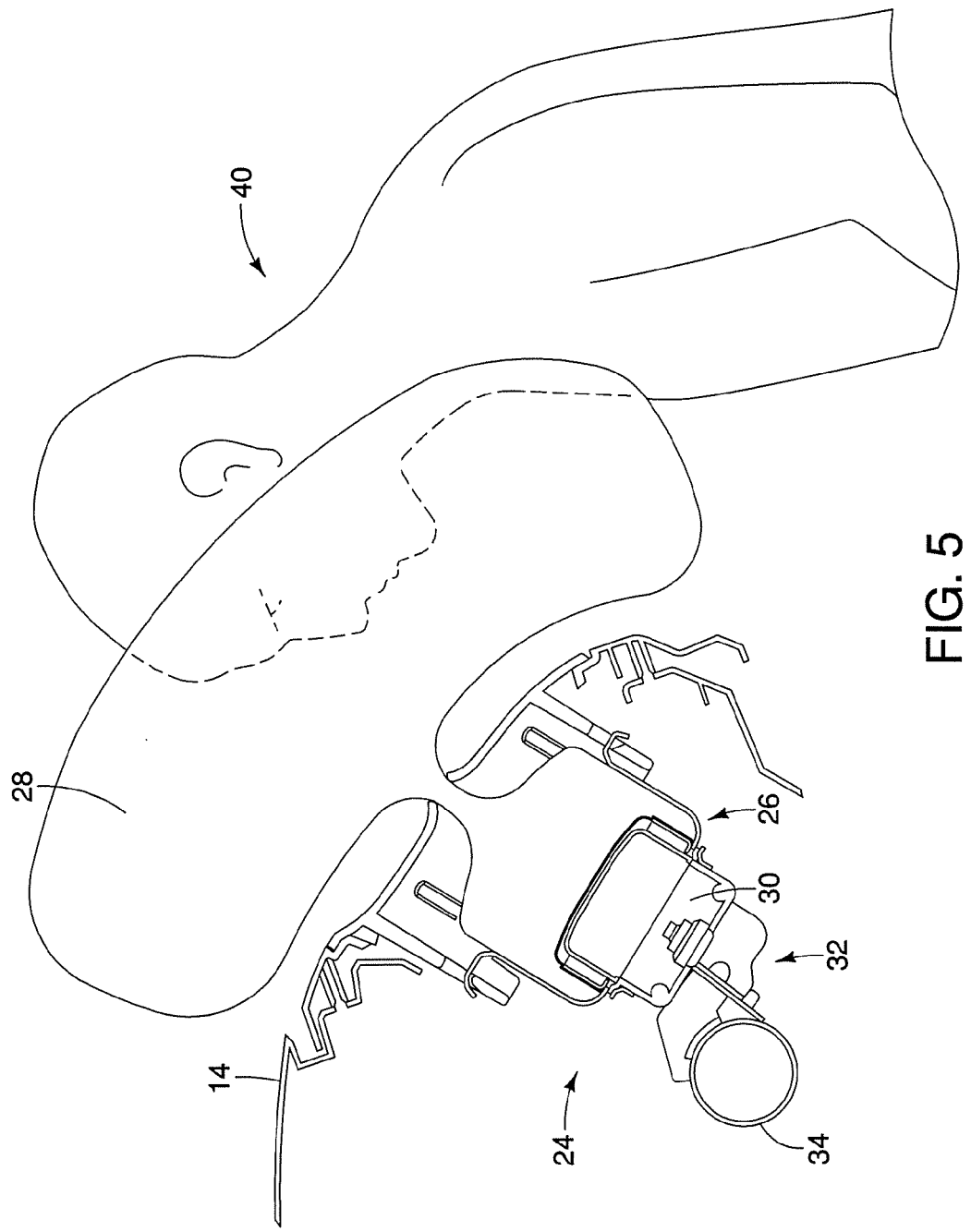
FIG. 5 is a cross-sectional view of the vehicle dashboard and airbag assembly showing a deployed airbag.
Figure 6:
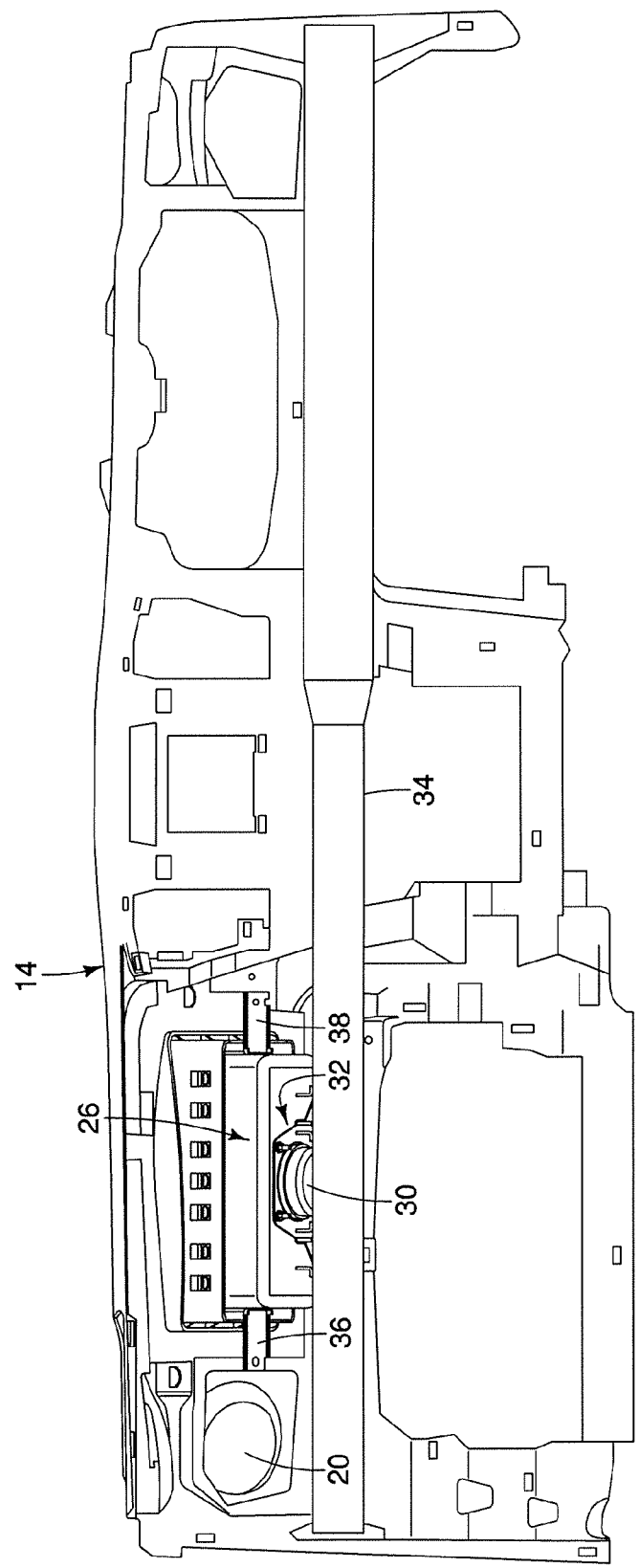
FIG. 6 is a rear perspective view of the vehicle dashboard.
Figure 7:
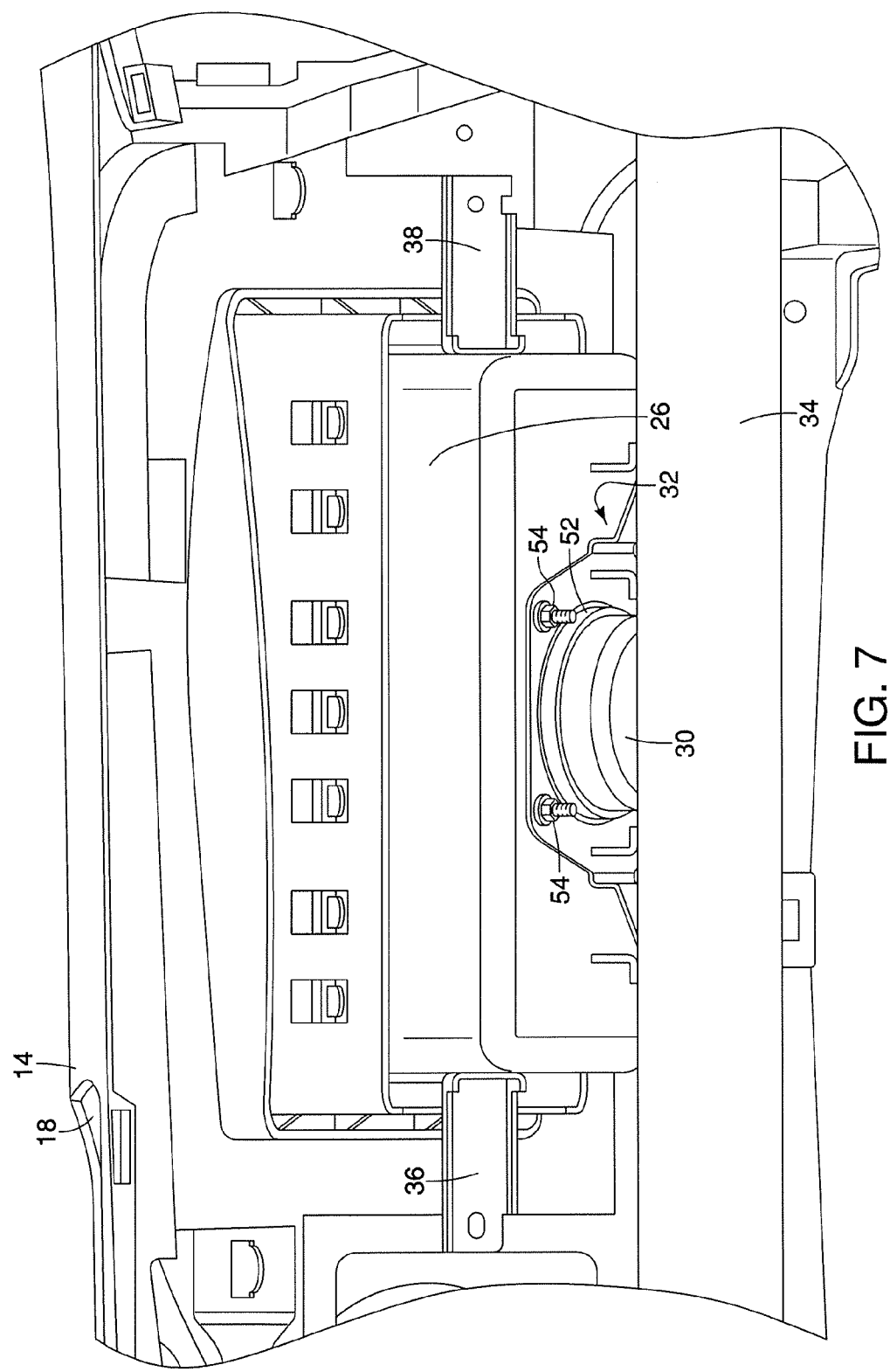
FIG. 7 is a detailed rear perspective view of the vehicle dashboard.
Figure 8:
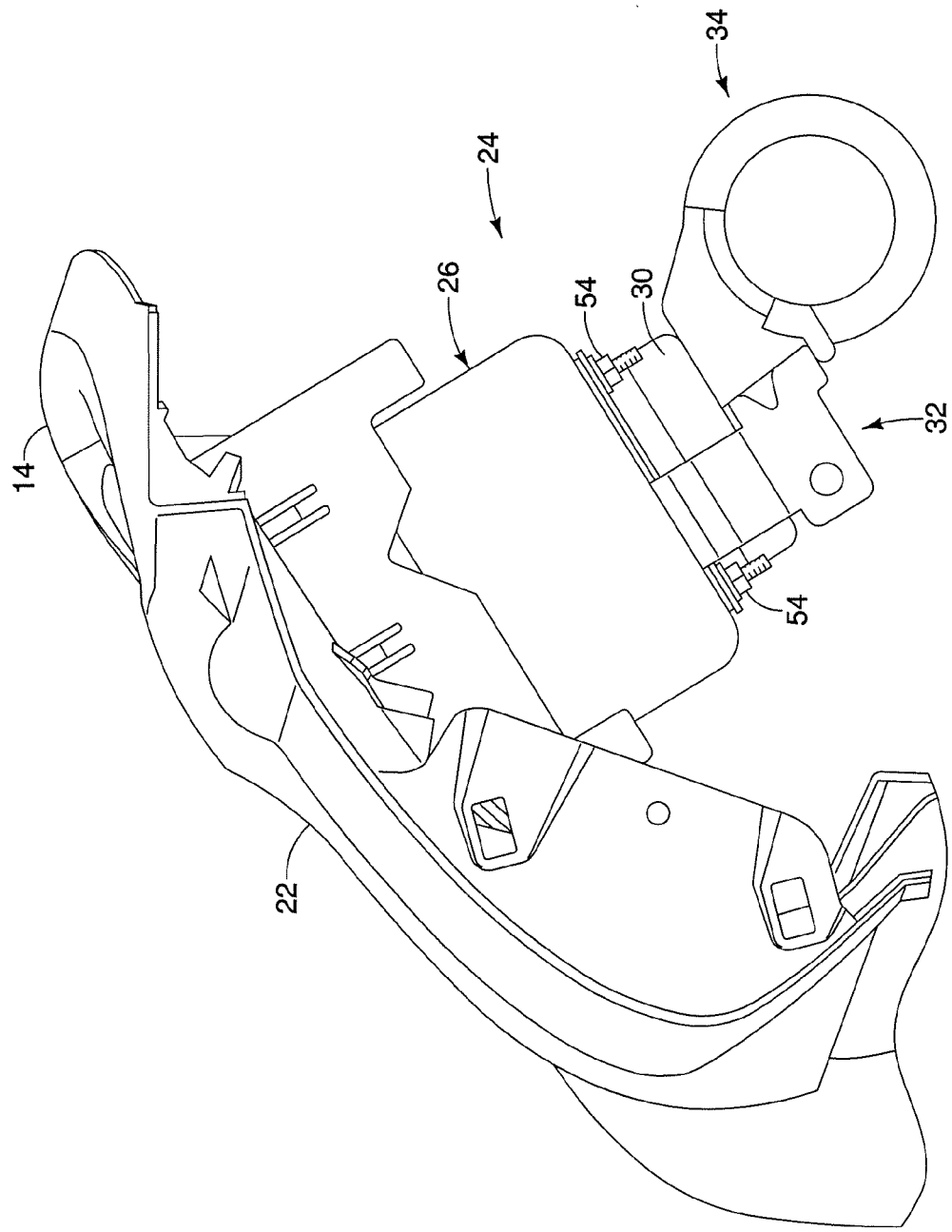
FIG. 8 is a side elevational view of the airbag assembly.
Figure 9:
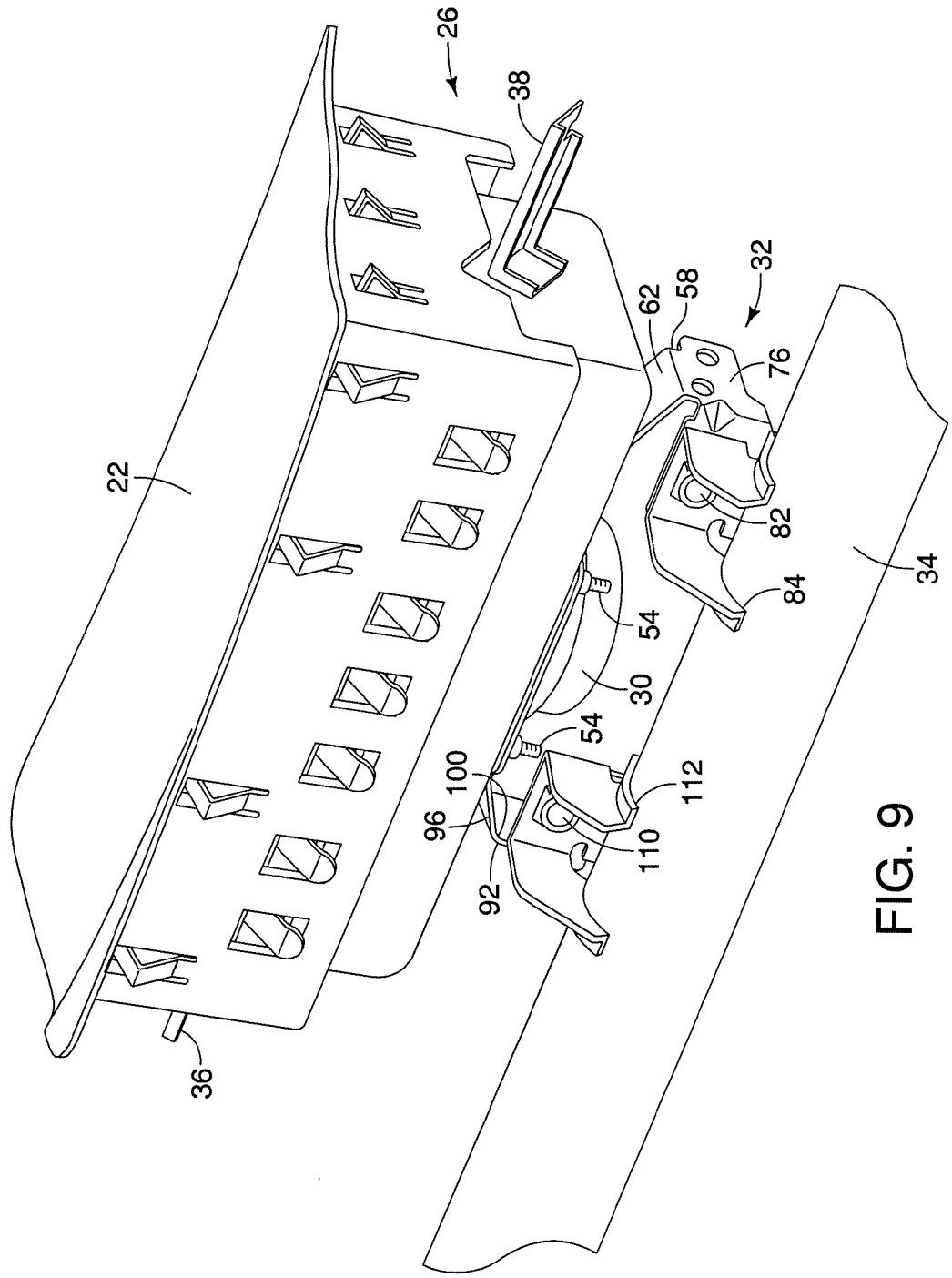
FIG. 9 is a detailed perspective view of the airbag and airbag support assemblies.
Figure 10:
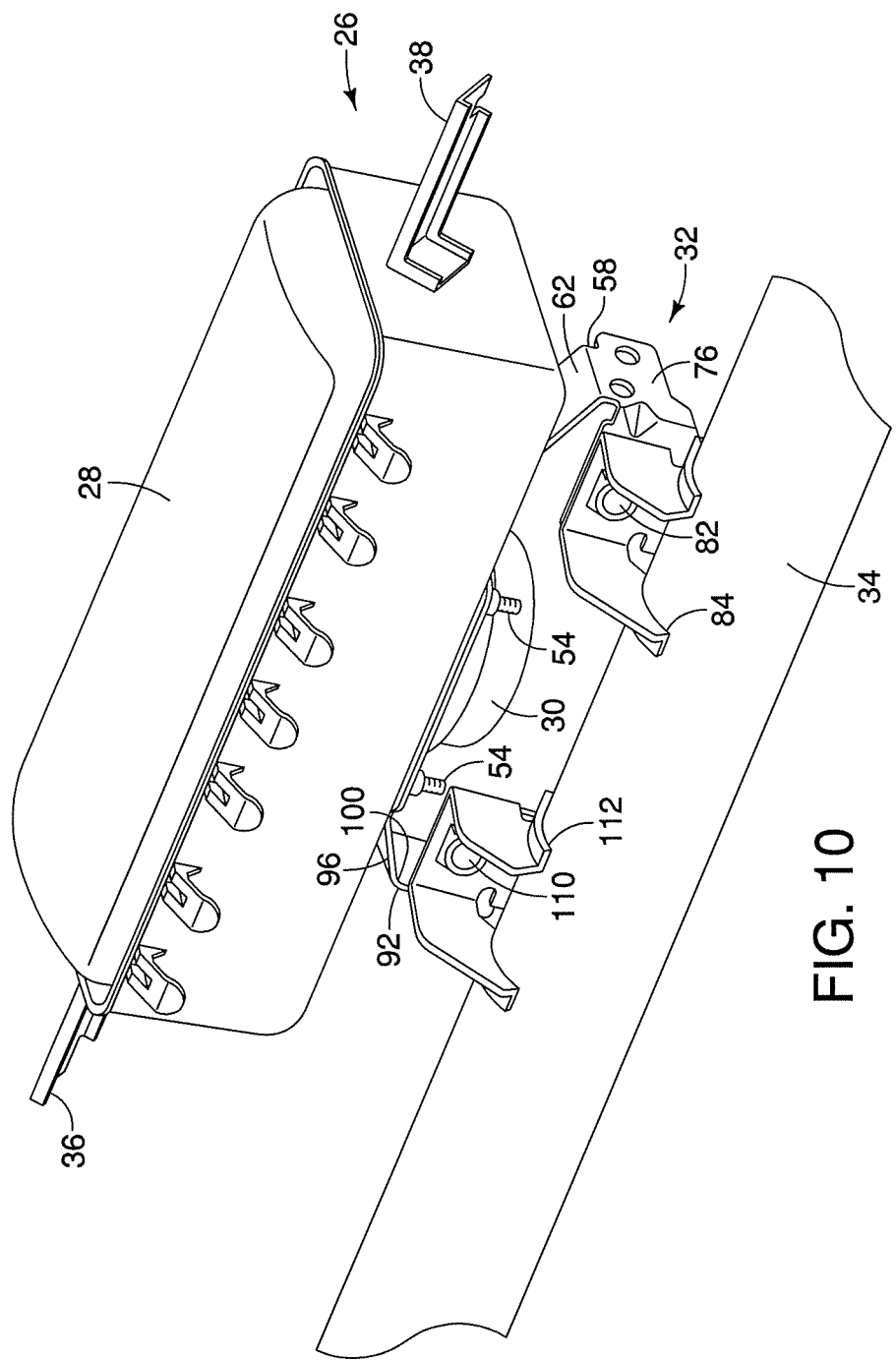
FIG. 10 is a detailed perspective view of the airbag and airbag support assemblies with the airbag cover panel removed.
Figure 11:
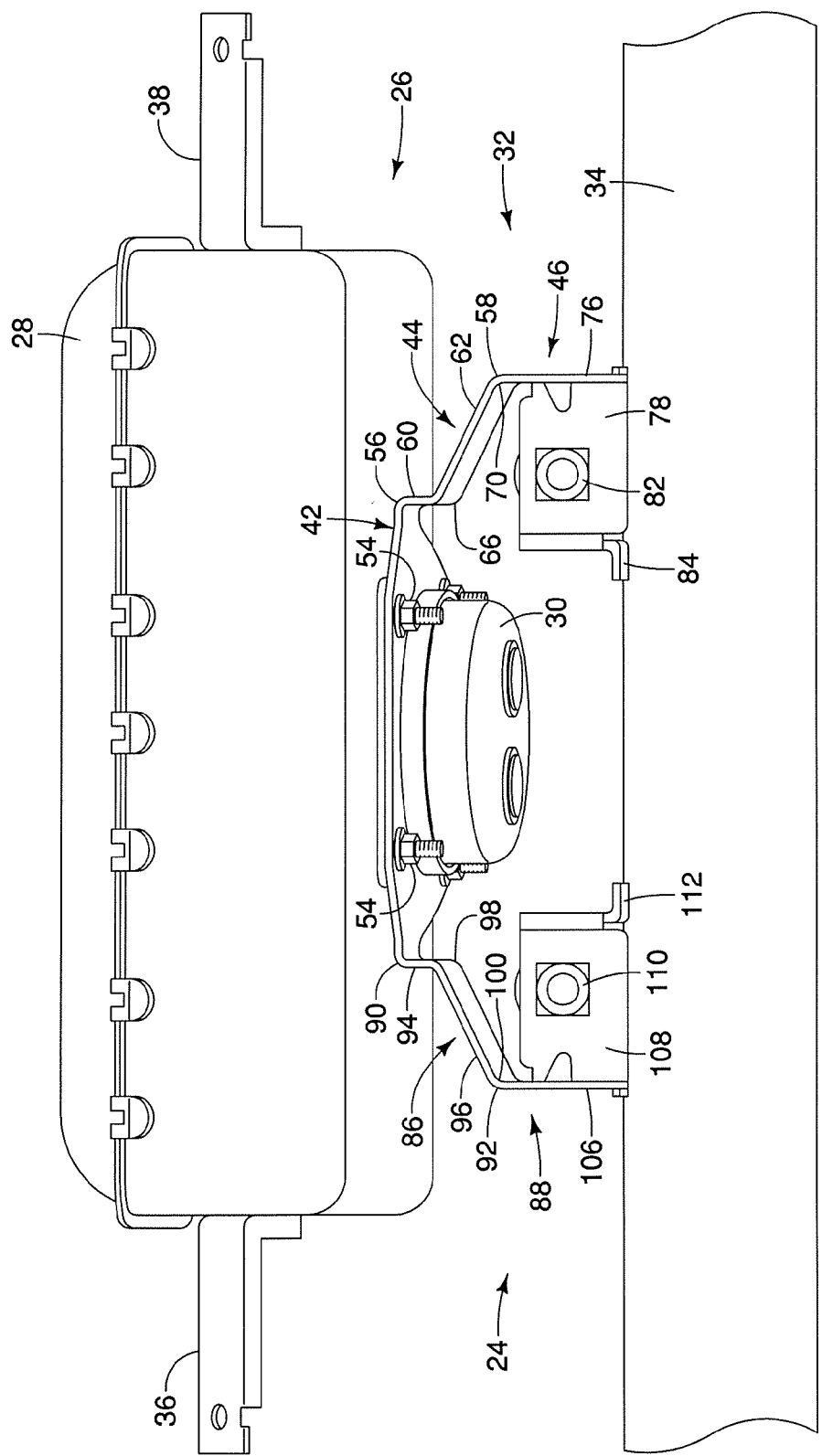
FIG. 11 is a rear elevational view of the airbag and airbag support assemblies with the airbag cover panel removed.
Figure 12:
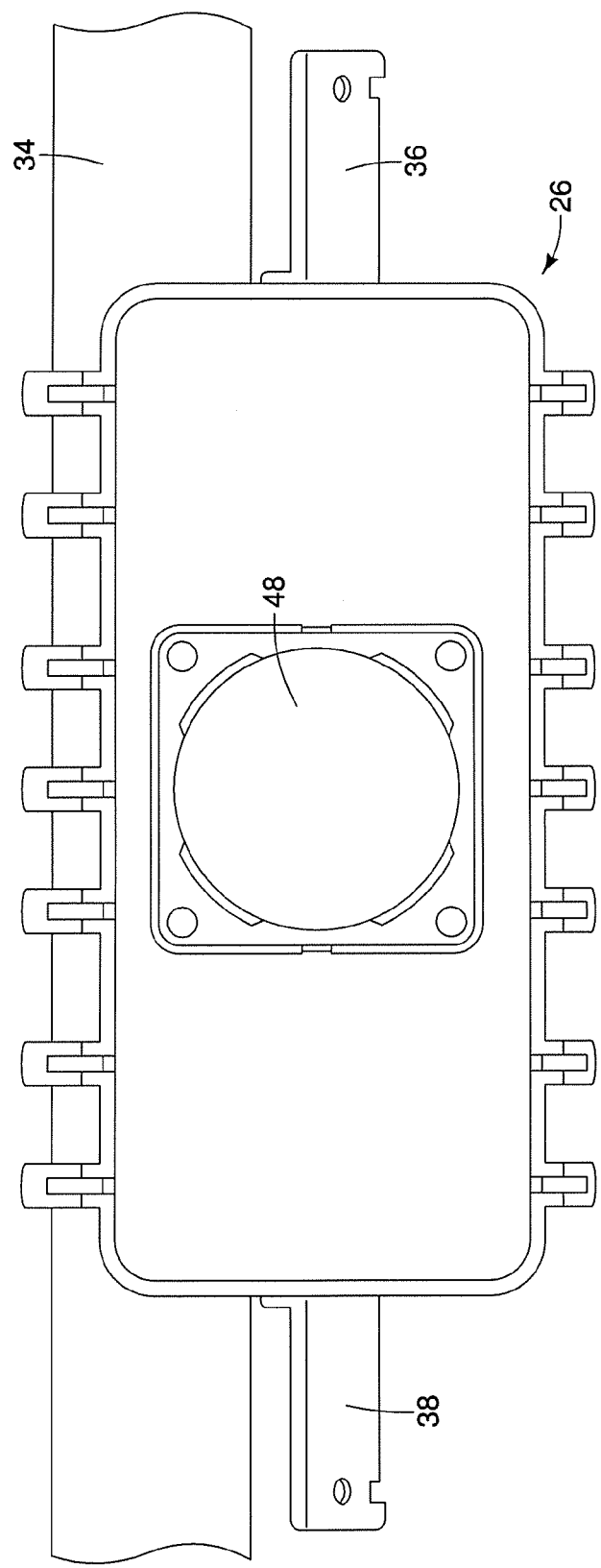
FIG. 12 is a top plan view of the airbag and airbag support assemblies with the airbag removed.
Figure 13:
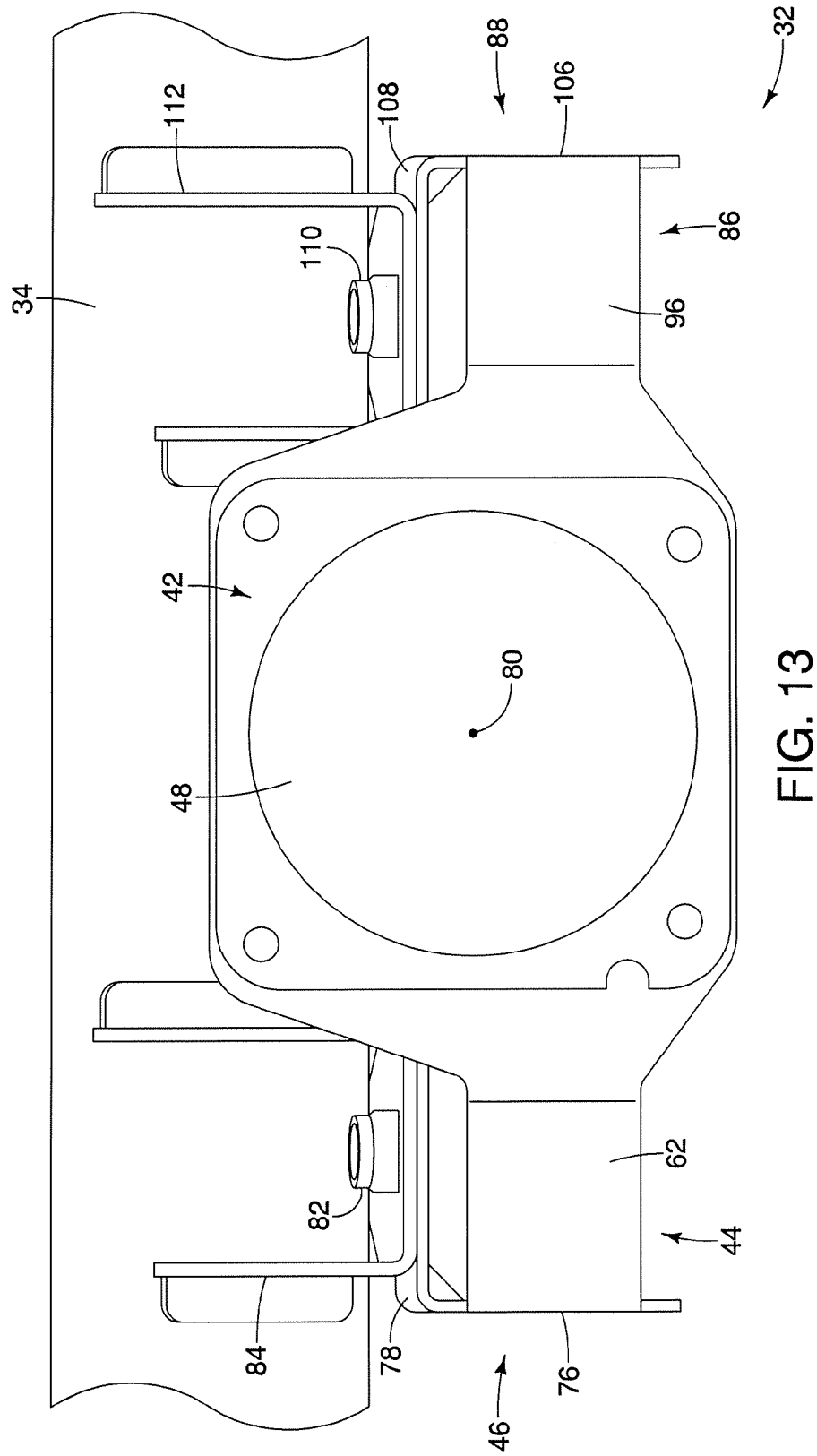
FIG. 13 is a top plan view of the airbag support assembly attached to a vehicle structural support member with the airbag module removed.

As shown in FIG. 5, when an impact event is detected, the airbag inflator 30 is detonated in order to inflate the airbag 28. Similarly to FIG. 3, an outer skin material of the dashboard 14 is removed in FIG. 5 for simplicity. The force of the airbag inflation opens the airbag cover panel 20 (e.g., separates the airbag cover panel 22 along a frangible seam) and the airbag 28 deploys into the passenger compartment 12 to provide a cushioning surface for a vehicle occupant 40.

However, because airbags typically deploy very quickly and with substantial force, if an obstacle in the passenger compartment 12 such as the vehicle occupant 40 or another object is situated directly adjacent to or on the dashboard 14 at the time of airbag deployment, then it is possible for the vehicle airbag assembly 24 to apply an undesirable amount of force on the obstacle. Accordingly, the vehicle airbag support structure 32 is configured to minimize the impact force of the deploying airbag 26 in such situations.

In this example, the vehicle airbag support structure 32 comprises a base member 42, a first support leg 44 and a mounting arrangement 46. The base member 42, first support leg 44 and mounting arrangement 46 can be formed as a single integral component, or as pieces that are connected by welding or in any other suitable manner. The vehicle airbag support structure 32 can be made of metal, such as stainless steel, or any other suitable material. The base member 42 defines an inflator aperture 48 for receiving at least a portion of the vehicle airbag module 26, namely a portion of the airbag inflator 30, such that the vehicle airbag module 26 is supported on a top surface 50 of the base member 42. In this example, the inflator aperture 48 is circular or substantially circular, and the base member 42 is configured to support the vehicle airbag module 26 which is positioned at the front passenger side of the passenger compartment 12.

Furthermore, a support lip 52 extends from the periphery of the inflator aperture 48 in a direction that is opposite to a facing direction of the top surface 50 of the base member 42. Also, the base member 42 includes a plurality of attachment structures 54, such as nut and bolt arrangements, screws, rivets or any other suitable type of fasteners that are configured to mount the vehicle airbag module 26 to the base member 42.

The first support leg 44 of the vehicle airbag support structure 32 includes a first end 56 and a second end 58, with a first segment 60 and a second segment 62 disposed between the first and second ends 56 and 58, respectively. The first end 56 is attached to a peripheral portion 64 of the base member 42. The first and second segments 60 and 62 are attached to each other at a first bend point 66 that provides for controlled and localized deformation of the first support leg 44 as discussed in more detail below.

The first and second segments 60 and 62, respectively, are disposed on a bottom side 68 of the base member 42 that faces in an opposite direction from the top surface 50 of the base member 42. The first segment 60 extends perpendicularly or substantially perpendicularly with respect to the base member 42, and the second segment 58 extends non-orthogonally with respect to the base member 42. Naturally, the first segment 60 need not extend perpendicularly with respect to the base member 42, but can also extend traverse of the base member 42.

In addition, the mounting arrangement 46 is attached to the second end 58 of the first support leg 44. The connection of the mounting arrangement 46 and second end 58 form a second bend point 70 that provides for controlled and localized deformation of the first support leg 44 as discussed in more detail below. The mounting arrangement 46 defines a fastening aperture 72 with a center fastener axis 74 arranged in a direction that is parallel or substantially parallel to a plane including the top surface 50 of the base member 42. Hence, the mounting arrangement 46 is configured to secure the vehicle airbag support structure 32 to the structural support member 34 of the vehicle 10.

As further illustrated, the mounting arrangement 46 includes a first portion 76 that is connected to the first support leg 44 and arranged parallel or substantially parallel to the first segment 60 of the first support leg 44. The mounting arrangement 46 also includes a second portion 78 that defines the fastening aperture 72 and extends perpendicularly or substantially perpendicularly from the first portion 76 toward a center axis 80 of the inflator aperture 48. A fastening member 82, such as a bolt, screw, rivet or other suitable fastener passes through the fastening aperture 72 and engages with an opening, for example, in a bracket 84 that is secured to the structural support member 34 by welds, bolts, screws, rivets or in any other suitable manner. Accordingly, the mounting arrangement 46, fastening member 82 and bracket 84 secure the vehicle airbag support structure 32 to the structural support member 34.

The vehicle airbag support structure 32 further comprises a second support leg 86 and a mounting arrangement 88 that are similar to first support leg 44 and mounting arrangement 46 as discussed above. That is, the second support leg 86 and mounting arrangement 88 are basically mirror images of first support leg 44 and mounting arrangement 46, respectively. In this example, the base member 42, second support leg 86 and mounting arrangement 88 can be formed as a single integral component. Additionally the base member 42, first and second support legs 44 and 86, and the mounting arrangements 46 and 88 can be formed as a single integral component, or as pieces that are connected by welding or in any other suitable manner.

Figure 15:
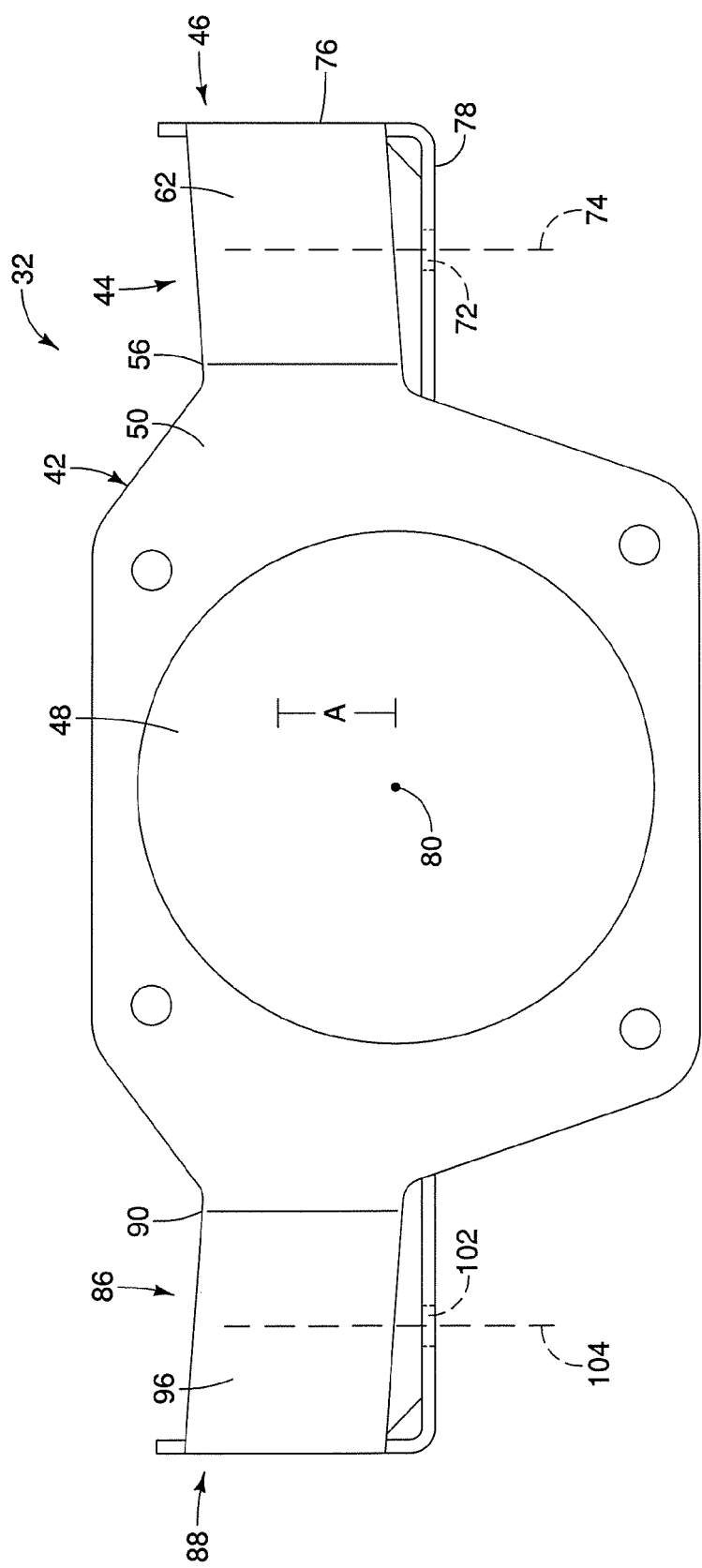
FIG. 15 is a top plan view of the airbag support assembly.
Figure 16:
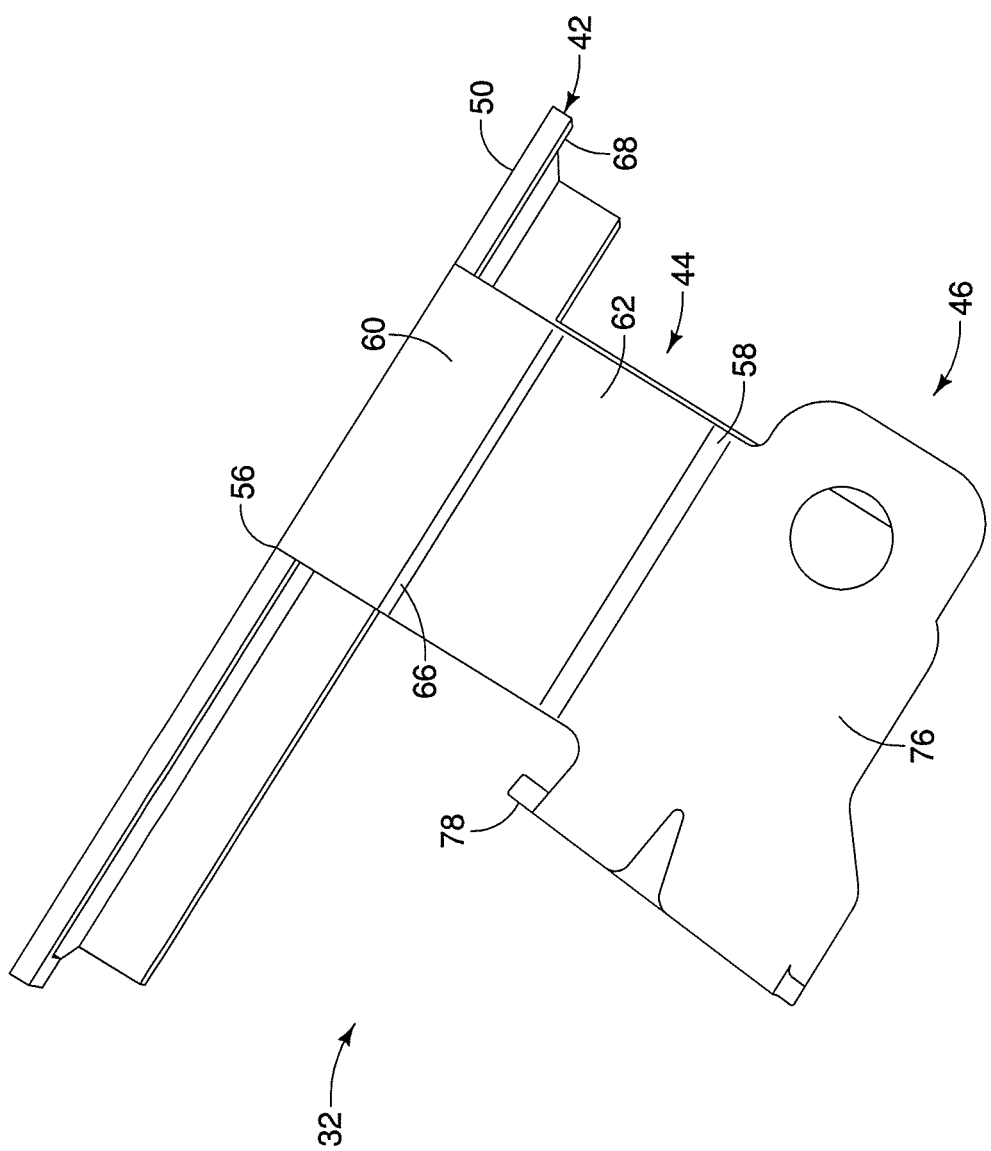
FIG. 16 is a side elevational view of the airbag support assembly.

As can be appreciated from the Figures, the first and second support legs 44 and 86, respectively, are laterally aligned in a first direction across the inflator aperture 48. Also, the first and second support legs 44 and 86, respectively, are laterally offset from the center axis 80 of the inflator aperture 48 by a distance A (shown in FIG. 15) in a second direction that is perpendicular or substantially perpendicular to the first direction. The distance A can be, for example, at or about 13 mm or any other suitable distance.

As with the first support leg 44 of the vehicle airbag support structure 32, the second support leg 86 includes a first end 90 and a second end 92, with a first segment 94 and a second segment 96 disposed between the first and second ends 90 and 92, respectively. The first end 90 is attached to the peripheral portion 64 of the base member 42. In the example, the first end 56 of the first support leg 44 and the first end 90 of the second support leg 86 are attached to opposite sides of the peripheral portion 64 of the base member 42, and are thus situated at opposite ends of the base member 42. The first and second segments 94 and 96 are attached to each other at a first bend point 98 that provides for controlled and localized deformation of the second support leg 86 as discussed in more detail below.

The first and second segments 94 and 96, respectively, are disposed on the bottom side 68 of the base member 42 that faces in an opposite direction from the top surface 50 of the base member 42. The first segment 94 extends perpendicularly or substantially perpendicularly with respect to the base member 42, and the second segment 96 extends non-orthogonally with respect to the base member 42. Naturally, the first segment 94 need not extend perpendicularly with respect to the base member 42, but can instead extend transverse to the base member 42.

In addition, the mounting arrangement 88 is attached to the second end 92 of the second support leg 86. The connection of the mounting arrangement 88 and second end 92 form a second bend point 100 that provides for controlled and localized deformation of the second support leg 86 as discussed in more detail below. The mounting arrangement 88 defines a fastening aperture 102 with a center fastener axis 104 arranged in a direction that is parallel or substantially parallel to a plane including the top surface 50 of the base member 42. Hence, the mounting arrangement 88 is configured to further secure the vehicle airbag support structure 32 to the structural support member 34 of the vehicle 10.

As further illustrated, the mounting arrangement 88 includes a first portion 106 that is connected to the second support leg 86 and arranged parallel or substantially parallel to the first segment 94 of the second support leg 86. The mounting arrangement 88 also includes a second portion 108 that defines the fastening aperture 102 and extends perpendicularly or substantially perpendicularly from the first portion 106 toward a center axis 80 of the inflator aperture 48. A fastening member 110, such as a bolt, screw, rivet or other suitable fastener passes through the fastening aperture 102 and engages with an opening, for example, in a bracket 112 that is secured to the structural support member 34 by welds, bolts, screws, rivets or in any other suitable manner. Accordingly, the mounting arrangement 88, fastening member 110 and bracket 112 further secure the vehicle airbag support structure 32 to the structural support member 34.

Exemplary operation of the vehicle airbag support structure 32 to reduce impact forces delivered by the vehicle airbag assembly 24 in situations where the airbag cover panel 22 is obstructed will now be explained.

As discussed above, upon the detection of an abrupt and substantial change in the acceleration of the vehicle 10, a triggering device sends a signal to the airbag deployment system that detonates the airbag inflator 30 in order to inflate the airbag 28. If an obstacle is within close proximity to the dashboard 14 and, in particular, the airbag cover panel 22, the airbag cover panel 22 and possibly the airbag 28 will contact the obstacle during airbag deployment. It should be noted that the deployment force of an airbag is typically greatest during the first 10 milliseconds of airbag deployment.

However, under the environmental circumstances described above, the deployment force of the airbag 28 is naturally met by a counterforce due to the presence of the obstacle in the path of airbag deployment. This counterforce will be translated through the airbag 28 and vehicle airbag module 26 and transfer to the vehicle airbag support structure 32. This force will thus cause the first and second support legs 44 and 88 of the vehicle airbag support structure 32 to deform in a controlled and localized manner about first bend points 66 and 98 and second bend points 70 and 100 in the directions indicated by arrows B1 and B2 in FIG. 14. It should be noted that the vehicle airbag assembly 24 can be configured in a manner such that little or no deformation occurs anywhere else in the vehicle airbag support structure 32, such as at the first ends 56 and 90 of the first and second support legs 44 and 86 of the vehicle airbag support structure 32, or at the base member 42 of the vehicle airbag support structure 32.

Figure 14:
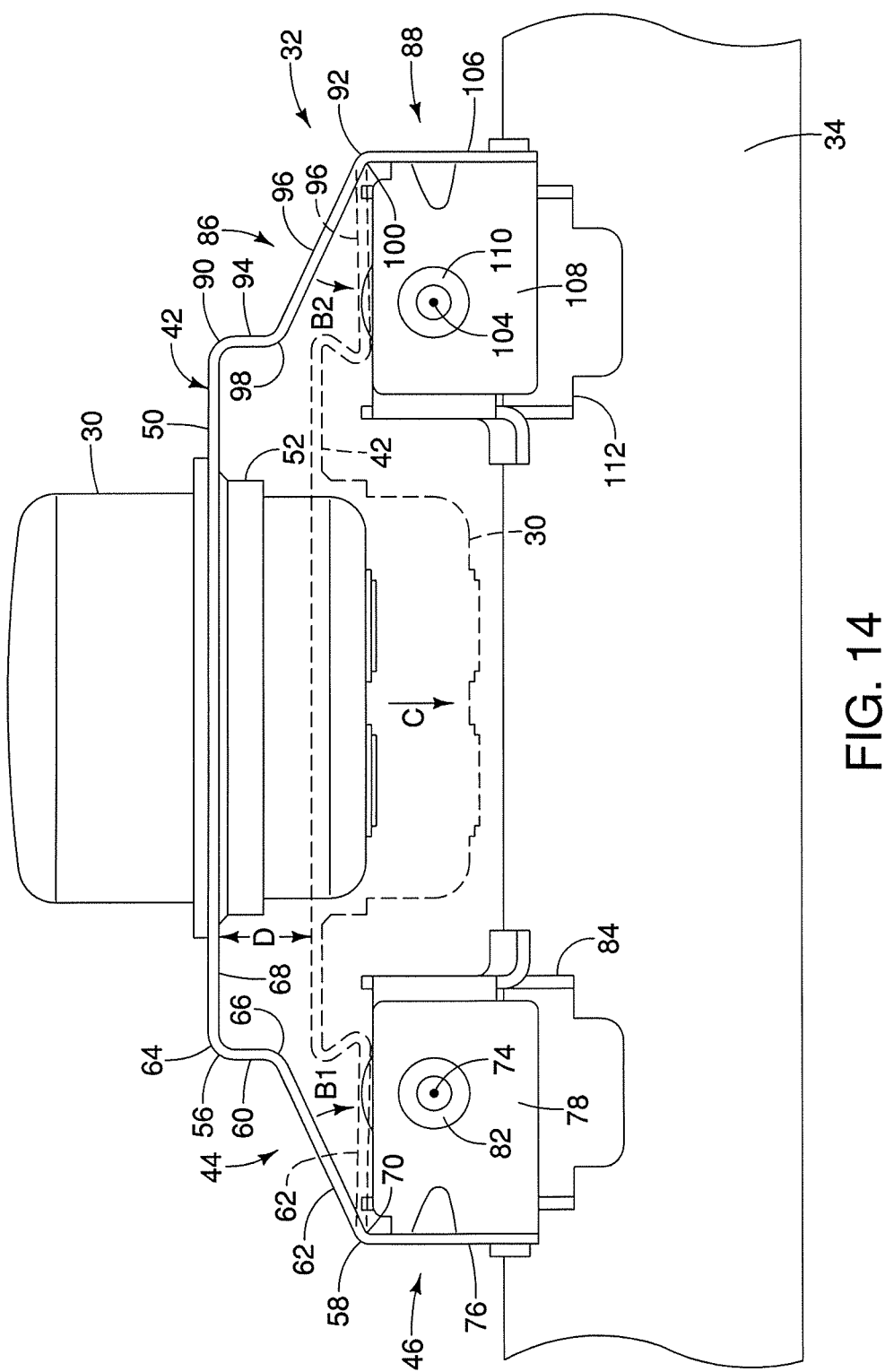
FIG. 14 is a front elevational view of the airbag support assembly and airbag inflator device.

Accordingly, the base portion 42 and thus, the vehicle airbag module 26, will move slightly in a rearward direction indicated by arrow C to a position indicated by the dotted lines in FIG. 14. As illustrated, little or no deformation occurs anywhere else in the vehicle airbag support structure 32. However, the first segments 60 and 94 will become tilted slightly outward as shown to accommodate for the deformation of the first and second support legs 44 and 88. Naturally, the second segments 62 and 96 will now extend at lesser angles with respect to the base member 42, and can even extend parallel or substantially parallel to the base member 42. For example, the deformation described above may dampen the deployment force of the airbag 28 during the first 10 milliseconds of airbag deployment by up to 50 percent. The greatest reduction in the deployment force of the airbag 28 and thus the largest deflection of the vehicle airbag module 26 will be experienced when the obstacle is directly adjacent to or touching the dashboard 14.

In this example, the vehicle airbag assembly 24 is designed in a manner such that the counterforce needed to deform the vehicle airbag support structure 32 is greater than or equal to about 1600 Newtons. In this case, the distance D that the vehicle airbag support structure 32 will deform, and thus the distance D that the base portion 42 will move rearward, is tuned to be at or about 25 mm. However, the size and strength of the vehicle airbag support structure 32 can be modified as needed and/or desired to achieve different deformation parameters such as deforming at a different force and/or across a different deformation distance.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle airbag support structure comprising:
a base member defining an inflator aperture for receiving at least a portion of a vehicle airbag module such that the vehicle airbag module is supported on a top surface of the base member;
a first support leg including a first end and a second end with a first segment and a second segment disposed between the first and second ends, the first end being attached to a peripheral portion of the base member with the first and second segments being disposed on a bottom side of the base member that faces in an opposite direction from the top surface of the base member, the first segment extending perpendicularly with respect to the base member, and the second segment extending non-orthogonally with respect to the base member;
a mounting arrangement attached to the second end of the first support leg, the mounting arrangement defining a fastening aperture with a center fastener axis arranged in a direction that is parallel to a plane including the top surface of the base member; and
a second support leg including a first end and a second end with a first segment and a second segment disposed between the first and second ends, the first end of the second support leg being attached to the peripheral portion of the base member with the first and second segments of the second support leg being disposed on the bottom side of the base member such that the first and second support legs are situated at opposite ends of the base member, the first segment of the second support leg extending perpendicularly with respect to the base member, the second segment of the second support leg extending non-orthogonally with respect to the base member, and the second segment of the first support leg and the second segment of the second support leg each extending away from a center axis of the inflator aperture.

2. The vehicle airbag support structure according to claim 1, wherein
the first and second support legs are laterally aligned in a first direction across the inflator aperture.

3. The vehicle airbag support structure according to claim 1, wherein
the first and second support legs are laterally aligned in a first direction across the inflator aperture, and the first and second support legs are laterally offset from the center axis of the inflator aperture in a second direction that is perpendicular to the first direction.

4. The vehicle airbag support structure according to claim 1, wherein
the base member is configured to support a front passenger airbag as part of the vehicle airbag module.

5. The vehicle airbag support structure according to claim 1, wherein
the mounting arrangement is configured to secure the vehicle airbag support structure to a structural support member of a vehicle equipped with the airbag support structure.

6. The vehicle airbag support structure according to claim 1, wherein
the mounting arrangement is configured to secure the vehicle airbag support structure to a cross-car beam of a vehicle equipped with the airbag support structure.

7. The vehicle airbag support structure according to claim 1, wherein
the mounting arrangement is configured to secure the vehicle airbag support structure to a structural support member that is situated adjacent to an instrument panel of a vehicle equipped with the airbag support structure.

8. The vehicle airbag support structure according to claim 1, wherein
the mounting arrangement includes a first portion connected to the first support leg and arranged parallel to the first segment of the first support leg.

9. The vehicle airbag support structure according to claim 1, wherein
the inflator aperture is circular.

10. The vehicle airbag support structure according to claim 1, further comprising
a support lip that extends from a periphery of the inflator aperture in a direction that is opposite to a facing direction of the top surface of the base member.

11. The vehicle airbag support structure according to claim 1, wherein
the base member includes a plurality of attachment structures configured to mount the vehicle airbag module to the base member.

12. The vehicle airbag support structure according to claim 1, wherein
the first and second segments are joined at a bend point that is configured to enable the first support leg to deform about the bend point when a force is applied to the vehicle airbag support structure.

13. The vehicle airbag support structure according to claim 12, wherein
the first segment is configured to remain extending perpendicularly with respect to the base member when the first support leg deforms about the bend point.

14. The vehicle airbag support structure according to claim 1, wherein
the mounting arrangement is attached to the second end of the first support leg to form a bend point that is configured to enable the first support leg to deform about the bend point when a force is applied to the vehicle airbag support structure.

15. A vehicle airbag support structure comprising:
a base member defining an inflator aperture for receiving at least a portion of a vehicle airbag module such that the vehicle airbag module is supported on a top surface of the base member;
a first support leg including a first end and a second end with a first segment and a second segment disposed between the first and second ends, the first end being attached to a peripheral portion of the base member with the first and second segments being disposed on a bottom side of the base member that faces in an opposite direction from the top surface of the base member, the first segment extending perpendicularly with respect to the base member, and the second segment extending non-orthogonally with respect to the base member; and
a mounting arrangement attached to the second end of the first support leg, the mounting arrangement defining a fastening aperture with a center fastener axis arranged in a direction that is parallel to a plane including the top surface of the base member, the mounting arrangement including a first portion connected to the first support leg and arranged parallel to the first segment of the first support leg and a second portion defining the fastening aperture and extending perpendicularly from the first portion toward a center axis of the inflator aperture.

16. A vehicle airbag support structure comprising:
a base member defining an inflator aperture for receiving at least a portion of a vehicle airbag module such that the vehicle airbag module is supported on a top surface of the base member;
a first support leg including a first end and a second end with a first segment and a second segment disposed between the first and second ends, the first end being attached to a peripheral portion of the base member with the first and second segments being disposed on a bottom side of the base member that faces in an opposite direction from the top surface of the base member, the first segment extending perpendicularly with respect to the base member, and the second segment extending non-orthogonally with respect to the base member; and
a mounting arrangement attached to the second end of the first support leg to form a bend point that is configured to enable the first support leg to deform about the bend point when a force is applied to the vehicle airbag support structure, the mounting arrangement defining a fastening aperture with a center fastener axis arranged in a direction that is parallel to a plane including the top surface of the base member, and the second segment being configured to pivot about the bend point in a direction toward the mounting arrangement when the first support leg deforms about the bend point.

17. A vehicle airbag support structure comprising:
a base member defining an inflator aperture for receiving at least a portion of a vehicle airbag module such that the vehicle airbag module is supported on a top surface of the base member;
a first support leg including a first end and a second end with a first segment and a second segment disposed between the first and second ends, the first end being attached to a peripheral portion of the base member with the first and second segments being disposed on a bottom side of the base member that faces in an opposite direction from the top surface of the base member, the first segment extending perpendicularly with respect to the base member, and the second segment extending non-orthogonally with respect to the base member; and
a mounting arrangement attached to the second end of the first support leg to form a first bend point that is configured to enable the first support leg to deform at the first bend point when a force is applied to the vehicle airbag support structure, and the second segment being configured to pivot at the first bend point in a direction toward the mounting arrangement and about a bend axis arranged in a direction that is parallel to a plane including the top surface of the base member.

18. The vehicle airbag support structure according to claim 17, further comprising
a second support leg having a first end that is attached to the peripheral portion of the base member such that the first and second support legs are situated at opposite ends of the base member.

19. The vehicle airbag support structure according to claim 18, wherein
the first and second support legs are laterally aligned in a first direction across the inflator aperture.

20. The vehicle airbag assembly according to claim 17, wherein
the first and second segments are joined at a second bend point that is configured to enable the first support leg to deform about the second bend point when the force is applied to the vehicle airbag support structure.

* * * * *